July 25, 1972   M. L. DRUIN ET AL   3,679,538
NOVEL OPEN-CELLED MICROPOROUS FILM
Filed Oct. 28, 1970   4 Sheets-Sheet 1

EFFECT of EXTENSION RATIO and HEAT-SET CONDITIONS on RATE of NITROGEN FLUX through MICROPOROUS POLYPROPYLENE FILMS.

United States Patent Office 3,679,538
Patented July 25, 1972

3,679,538
NOVEL OPEN-CELLED MICROPOROUS FILM
Melvin L. Druin, West Orange, John T. Loft, Springfield, and Steven G. Plovan, Livingston, N.J., assignors to Celanese Corporation, New York, N.Y.
Continuation-in-part of abandoned application Ser. No. 876,511, Nov. 13, 1969. This application Oct. 28, 1970, Ser. No. 84,712
Int. Cl. B32b *3/00;* B29c *17/02*
U.S. Cl. 161—159                17 Claims

ABSTRACT OF THE DISCLOSURE

Open-celled microporous polymer films characterized by having a reduced bulk density as compared to the bulk density of the corresponding polymer films having no open-celled structure, a crystallinity of above about 30 percent, a pore size of less than 5000 angstroms and a nitrogen flux of greater than 35.4, are prepared by the consecutive steps of cold stretching, hot stretching and heat setting a non-porous, crystalline, elastic film.

CROSS-REFERENCES TO RELATED APPLICATIONS

This is a continuation-in-part of abandoned application Ser. No. 876,511 filed Nov. 13, 1969.

BACKGROUND OF THE INVENTION

Field of the invention

The present invention relates to a novel process for producing open-celled microporous films from synthetic resins or polymers, and to the films produced thereby.

Porous or cellular films can be classified into two general types: one type in which the pores are not interconnected, i.e., a closed-cell film, and the other type in which the pores are essentially interconnected through tortuous paths which may extend from one exterior surface or surface region to another, i.e., an open-celled film. The porous films of the present invention are of the latter type.

Further, the porous films of the present invention are microscopic, i.e., the details of their pore configuration or arrangement are descernible only by microscopic examination. In fact, the open cells or pores in the films are smaller than those which can be measured using an ordinary light microscope, because the wavelength of visible light, which is about 5,000 angstroms (an angstrom is one ten-billionth of a meter), is longer than the longest planar or surface dimension of the open cell or pore. The microporous films of the present invention may be identified, however, by using electron microscopy techniques which are capable of resolving details of pore structure below 5,000 angstroms.

The microporous films of the present invention are also characterized by a reduced bulk density, sometimes hereinafter referred to simply as a "low" density. The bulk density is also a measure of the increase in porosity of the films. That is, these microporous films have a bulk or overall density lower than the bulk density of corresponding films composed of identical polymeric material but having no open-celled or other voidy structure. The term "bulk density" as used herein means the weight per unit of gross or geometric volume of the film, where gross volume is determined by immersing a known weight of the film in a vessel partly filled with mercury at 25° C. and atmospheric pressure. The volumetric rise in the level of mercury is a direct measure of the gross volume. This method is known as the mercury volumenometer method, and is described in the Encyclopedia of Chemical Technology, vol. 4, page 892 (Interscience 1949). Other important characteristics of the films of the present invention reside in their nitrogen flux, surface area and breaking elongation, all of which serve to distinguish the films from those of the prior art.

Summary of the prior art

Heretofore, films have been prepared from synthetic resins or polymers, e.g., polypropylene, by various melt extrusion or casting methods. Such films have many desirable properties such as high strength, and resistance to heat, light, and various chemicals.

For specific applications such as filter media and backings for breathable medical dressings or bandages, however, films having a porous structure in addition to their other properties are necessary or highly desirable.

Porous films have been produced which posses a microporous, open-celled structure, and which are also characterized by a reduced bulk density. Films possessing this microporous structure are described, for example, in U.S. Patent 3,426,754, which patent is assigned to the assignee of the present invention. The preferred method of preparation described therein involves drawing or stretching at ambient temperatures, i.e., "cold drawing," a crystalline, elastic starting film in an amount of about 10 to 300% of its original length, with subsequent stabilization by heat setting of the drawn film under a tension such that the film is not free to shrink or can shrink only to a limited extent. However, the films of this patent are easily distinguished from those claimed herein by the nitrogen flux and breaking elongation characteristics.

While the above described microporous or void-containing film of the prior art is useful, the search has continued for new processes able to produce open-celled microporous films having a greater number of pores, a more uniform pore concentration or distribution, a larger total pore area, and better thermal stability of the porous or voidy film. These properties are significant in applications such as filter media where a large number of uniformly distributed pores are necessary or highly desirable; and in applications such as breathable medical dressings subject to high temperatures, e.g., sterilization temperatures, where thermal stability is necessary or highly desirable.

SUMMARY OF THE INVENTION

Accordingly, an object of the present invention is to provide novel microporous films and processes for producing these microporous polymer films which have improved porosity and thermal stability so as to prevent or substantially alleviate the limitations or disadvantages of known porous or voidy polymer films of the prior art.

Another object of the present invention is to provide novel open-celled microporous polymer films having improved porosity and stability.

Other advantages and further objects of the present invention will be apparent to those skilled in the art as the description thereof proceeds.

In accordance with the present invention, processes are provided for preparing open-celled microporous polymer films from non-porous, crystalline, elastic polymer starting films. The process steps include (1) cold stretching, i.e., cold drawing, the elastic film until porous surface regions or areas which are elongated normal or perpendicular to the stretch direction are formed, (2) hot stretching, i.e., hot drawing, the cold stretched film until fibrils and pores or open cells which are elongated parallel to the stretch direction are formed, and thereafter (3) heating or heat-setting the resulting porous film under tension, i.e., at substantially constant length, to impart stability to the film.

The resulting open-celled microporous polymer films are characterized by having a nitrogen flux of greater than about 35.4, preferably greater than about 40, a bulk density lower than the density of the polymeric starting elastic material from which it is formed, usually of the elastic starting material and a surface area of at least 30 sq. m./cc. The final products formed from polypropylene also exhibit a breaking elongation of about 50 to about 150 percent.

The elastic starting film is preferably made from crystalline polymers such as polypropylene or oxymethylene polymers by melt extruding the polymer into film, taking up the extrudate at a drawdown ratio giving an oriented film, and thereafter heating or annealing the oriented film if necessary to improve or enhance the initial crystallinity.

The essence of the present invention is the discovery that the sequential cold stretching and hot stretching steps impart to the elastic film a unique open-celled structure which results in advantageous properties, including improved or greater porosity by reduction of bulk density, improved thermal stability and a gain or enhancement of porosity when treated with certain organic liquids such as perchlorethylene.

As determined by various morphological techniques or tests such as electron microscopy, the microporous films of the present invention are characterized by a plurality of elongated, non-porous, interconnecting surface regions or areas which have their axes of elongation substantially parallel. Substantially alternating with and defined by these non-porous surface regions are a plurality of elongated, porous surface regions which contain a plurality of parallel fibrils or fibrous threads. These fibrils are connected at each of their ends to the non-porous regions, and are substantially parallel to each other and substantially perpendicular to said axes of elongation. Between the fibrils are the pores or open cells of the films of the present invention. These surface pores or open cells are substantially interconnected through tortuous paths or passageways which extend from one surface region to an opposite surface area or region.

With such a defined or organized morphological structure, the films of the present invention have a greater proportion of surface area, a greater number of pores, and a more uniform distribution of pores, than previous microporous films. Further, the fibrils present in the films of the present invention are more drawn or oriented with respect to the rest of the polymer material in the film, and thus contribute to the higher thermal stability of the film.

Other aspects and advantages of the present invention will become apparent to one skilled in the art to which the present invention pertains from the following more detailed description of preferred embodiments when read in conjunction with the appended drawings.

DESCRIPTION OF THE PREFERRED EMBODIMENTS

The microporous films of the present invention are formed from a starting elastic film of crystalline, film-forming, polymers. These elastic films have an elastic recovery at zero recovery time (hereinafter defined) when subjected to a standard strain (extension) of 50 percent at 25° C. and 65 percent relative humidity of at least about 40 percent, preferably at least about 50 percent, and most preferably at least about 80 percent.

Elastic recovery as used herein is a measure of the ability of structure or shaped article such as a film to return to its original size after being stretched, and may be calculated as follows:

Elastic Recovery (ER) percent $$= \frac{\left(\begin{array}{c}\text{length} \\ \text{when stretched}\end{array}\right) - \left(\begin{array}{c}\text{length} \\ \text{after stretching}\end{array}\right)}{\text{length added when stretched}} \times 100$$

Although a standard strain of 50 percent is used to identify the elastic properties of the starting films, such strain is merely exemplary. In general, such starting films will have elastic recoveries higher at strains less than 50 percent, and somewhat lower at strains substantially higher than 50 percent, as compared to their elastic recovery at a 50 percent strain.

These starting elastic films will also have a percent crystallinity of at least 20 percent, preferably at least 30 percent, and most preferably at least 50 percent, e.g., about 50 to 90 percent, or more. Percent crystallinity is determined by the X-ray method described by R. G. Quynn et al. in the Journal of Applied Polymer Science, vol. 2, No. 5, pp. 166–173 (1959). For a detailed discussion of crystallinity and its significance in polymers, see Polymers and Resins, Golding (D. Van Nostrand, 1959).

Preferred suitable starting elastic films, as well as the preparation thereof, are further defined in copending application Ser. No. 572,601, filed Aug. 15, 1966, Wissbrun and Bierenbaum, inventors, and assigned to the same assignee as the present invention.

Other elastic films considered suitable for the practice of the present invention are described in British Patent 1,052,550, published Dec. 21, 1966.

The starting elastic film utilized in the preparation of the microporous films of the present invention should be differentiated from films formed from classical elastomers such as the natural and synthetic rubbers. With such classical elastomers the stress-strain behavior, and particularly the stress-temperature relationship, is governed by entropy-mechanism of deformation (rubber elasticity). The positive temperature coefficient of the retractive force, i.e., decreasing stress with decreasing temperature and complete loss of elastic properties at the glass transition temperatures, are particularly consequences of entropy-elasticity. The elasticity of the starting elastic films utilized herein, on the other hand, is of a different nature. In qualitative thermodynamic experiments with these elastic starting films, increasing stress with decreasing temperature (negative temperature coefficient) may be interpreted to mean that the elasticity of these materials is not governed by entropy effects but dependent upon an energy term. More significantly, the starting elastic films have been found to retain their stretch properties at temperatures where normal entropy-elasticity could no longer be operative. Thus, the stretch mechanism of the starting elastic films is thought to be based on energy-elasticity relationships, and these elastic films may then be referred to as "non-classical" elastomers.

As stated, the starting elastic films employed in this invention are made from a polymer of a type capable of developing a significant degree of crystallinity, as contrasted with more conventional or "classical" elastic materials such as the natural and synthetic rubbers which are substantially amorphous in their unstretched or tensionless state.

A significant group of polymers, i.e., synthetic resinous materials, to which this invention may be applied are the olefin polymers, e.g., polyethylene, polypropylene, poly-3-methyl butene-1, poly-4-methyl pentene-1, as well as copolymers of propylene, 3-methyl butene-1, 4-methyl pentene-1, or ethylene with each other or with minor amounts of other olefins, e.g., copolymers of propylene and ethylene, copolymers of a major amount of 3-methyl butene-1 and a minor amount of a straight chain n-alkene such as n-octene-1, n-hexadecene-1, n-octadecene-1, or other relatively long chain alkenes, as well as copolymers of 3-methyl pentene-1 and any of the same n-alkenes mentioned previously in connection with 3-methyl butene-1. These polymers in the form of films should generally have a percent crystallinity of at least 20 percent, preferably at least 30 percent, and most preferably about 50 percent to 90 percent, or higher.

For example, a film-forming homopolymer of polypropylene may be employed. When propylene homopolymers are contemplated, it is preferred to employ an isotatic polypropylene having a percent crystallinity as indicated above, a weight average molecular weight ranging from about 100,000 to 750,000 preferably about 200,000 to 500,000 and a melt index (ASTM–1958D–1238–57T, Part 9, page 38) from about 0.1 to about 75, preferably about 0.5 to 30, so as to give a final film product having the requisite physical properties.

While the present disclosure and examples are directed primarily to the aforesaid olefin polymers, the invention also contemplates the high molecular weight acetal, e.g., oxymethylene, polymers. While both acetal homopolymers and copolymers are contemplated, the preferred acetal polymer is a "random" oxymethylene copolymer, i.e., one which contains recurring oxymethylene, i.e., $-CH_2-O-$, units interspersed with $-OR-$ groups in the main polymer chain where R is a divalent radical containing at least two carbon atoms directly linked to each other and positioned in the chain between the two valences, with any substituents on said R radical being inert, that is, which do not include interfering functional groups and which will not induce undesirable reactions, and wherein a major amount of the $-OR-$ units exist as single units attached to oxymethylene groups on each side. Examples of preferred polymers include copolymers of trioxane and cyclic ethers containing at least two adjacent carbon atoms such as the copolymers disclosed in United States Patent 3,027,352 of Walling et al. These polymers in film form may also have a crystallinity of at least 20 percent, preferably at least 30 percent, and most preferably at least 50 percent, e.g., 50 to 60 percent, or higher. Further, these polymers have a melting point of at least 150° C. and a number average molecular weight of at least 10,000. For a more detailed discussion of acetal and oxymethylene polymers, see, Formaldehyde, Walker, pp. 175–191 (Reinhold, 1964).

Other relative crystalline polymers to which the invention may be applied are the polyalkylene sulfides such as polymethylene sulfide and polyethylene sulfide, the polyarylene oxides such as polyphenylene oxide, the polyamides such as polyhexamethylene adipamide (nylon 66) and polycaprolactam (nylon 6), and polyesters such as polyethylene terephthalate, all of which are well known in the art and need not be described further herein for sake of brevity.

The types of apparatus suitable for forming the starting elastic films of this invention are well known in the art.

For example, a conventional film extruder equipped with a shallow channel metering screw and coat hanger die, is satisfactory. Generally, the resin is introduced into a hopper of the extruder which contains a screw and a jacket fitted with heating elements. The resin is melted and transferred by the screw fo the die from which it is extruded through a slot in the form of a film from which it is drawn by a take-up or casting roll. More than one take-up roll in various combinations or stages may be used. The die opening or slot width may be in the range, for example, of about 10 to 200 mils.

Using this type of apparatus, film may be extruded at a drawdown ratio of about 20:1 to 200:1, preferably 50:1 to 150:1.

The terms "drawdown ratio" or, more simply, "draw ratio," as used herein is the ratio of the film wind-up or take-up speed to the speed of the film issuing at the extrusion die.

The melt temperature for film extrusion is, in general, no higher than about 100° C. above the melting point of the polymer and no lower than about 10° C. above the melting point of the polymer.

For example, polypropylene may be extruded at a melt temperature of about 180° C. to 270° C. preferably 200° C. to 240° C. Polyethylene may be extruded at a melt temperature of about 175° to 225° C. while acetal polymers, e.g., those of the type disclosed in U.S. Patent 3,027,352, may be extruded at a melt temperature of about 185° C. to 235° C. preferably 195° to 215° C.

The extrusion operation is preferably carried out with rapid cooling and rapid drawdown in order to obtain maximum elasticity. This may be accomplished by having the take-up roll relatively close to the extrusion slot, e.g., within two inches and, preferably, within one inch. An "air knife" operating at temperatures between, for example 0° C. and 40° C., may be employed within one inch of the slot to quench, i.e., quickly cool and solidify, the film. The take-up roll may be rotated, for example, at a speed of 10 to 1000 ft./min., preferably 50 to 500 ft./min.

While the above description has been directed to slit die extrusion methods, an alternative method of forming the starting elastic films contemplated by this invention is the blown film extrusion method wherein a hopper and an extruder are employed which are substantially the same as in the slot extruder described above. From the extruder, the melt enters a die from which it is extruded through a circular slot to form a tubular film having an initial diameter $D_1$. Air enters the system through an inlet into the interior of said tubular film and has the effect of blowing up the diameter of the tubular film to a diameter $D_2$. Means such as air rings may also be provided for directing the air about the exterior of extruded tubular film so as to provide quick and effective cooling. Means such as a cooling mandrel may be used to cool the interior of the tubular film. After a short distance during which the film is allowed to completely cool and harden, it is wound up on a take-up roll.

Using the blown film method, the drawdown ratio is preferably 20:1 to 200:1, the slot opening 10 to 200 mils, the $D_2/D_1$ ratio, for example, 0.5 to 6.0 and preferably about 1.0 to about 2.5, and the take-up speed, for example, 30 to 700 ft./min. The melt temperature may be within the ranges given previously for straight slot extrusion.

The extruded film may then be initially heat treated or annealed in order to improve crystal structure, e.g., by increasing the size of the crystallites and removing imperfections therein. Generally, this annealing is carried out at a temperature in the range of about 5° C. to 100° C. below the melting point of the polymer for a period of a few seconds to several hours, e.g., 5 seconds to 24 hours, and preferably from about 30 seconds to 2 hours. For polypropylene, the preferred annealing temperature is about 100 to 155° C., while for oxymethylene (acetal) copolymers, the preferred annealing temperature is about 110 to 165° C.

An exemplary method of carrying out the annealing is by placing the extruded film in a tensioned or tensionless state in an oven at the desired temperature in which case the residence time is preferably in the range of about 30 seconds to 1 hour.

The resulting partly-crystalline film is then subjected to the process of this invention to form the novel microporous films. As mentioned hereinabove, this process generally comprises the consecutive steps of cold stretching, hot stretching and heat setting the starting non-porous, crystalline, elastic film. This process is more specifically described hereinafter.

Figure 1:
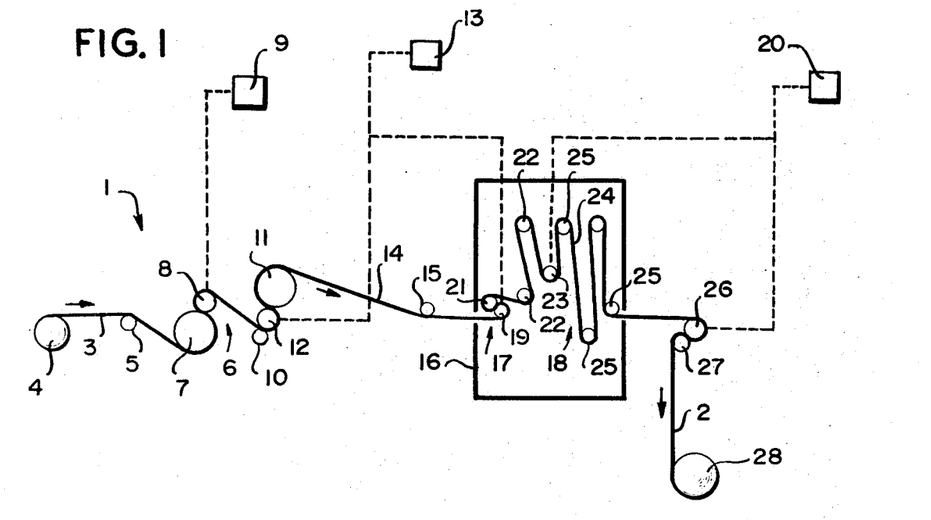
FIG. 1 schematically illustrates apparatus suitable for carrying out the process of the present invention.

FIG. 1 shows a schematic diagram of exemplary continuous apparatus 1 suitable for production according to the present invention of microporous film 2 from an elastic starting film 3. The elastic film 3 from a supply or feed roll 4 is fed over an idler roll 5 into a cold stretching zone 6. The cold stretching apparatus comprises a nip roll 7 cooperating with a first cold stretch roll 8 which is driven at a peripheral speed $S_1$ by suitable driving means 9, and two nip rolls 10 and 11 which cooperate with a second cold stretch roll 12 which is driven at a peripheral speed $S_2$, which is greater than $S_1$, by a suitable driving means 13. The elastic film 3 is thereby cold stretched at a cold stretch ratio of $S_2/S_1$. The cold stretched film 14 is then fed over an idler roll 5 into an oven 16 which provides heat for both the hot stretching zone 17 and the heat setting zone 18. The hot stretching apparatus comprises a hot stretch roll 19 driven by suitable means 13 at a peripheral speed $S_3$, which is about the same or slightly, e.g., less 10 percent, greater than $S_2$, to prevent relaxation of the cold stretched film 14. The hot stretch roll 19 cooperates with nip roll 21 so as to provide sufficient frictional engagement. Idler rolls 22 may be provided to achieve desired residence time in the oven and yet minimize necessary oven capacity. A second hot stretch roll 23 is driven by driving means 20 at a peripheral speed $S_4$, which is greater than $S_3$. The cold stretched film 15 is thereby hot stretched at a hot stretch ratio of $S_4/S_3$. The cold stretched-hot stretched film 24 is passed around idler rolls 25 to achieve sufficient residence time for heat setting, and is then passed about a take-up roll 26 and a nip roll 27 and collected on a conventional take-up roll 28. The take-up roll 26 is driven by driving means 20 at about the same speed as hot stretch roll 23 as to maintain the film in tension during heat setting.

The term "cold stretching" as used herein is defined as stretching or drawing a film to greater than its original length and at a stretching temperature, i.e., the temperature of the film being stretched, less than the temperature at which melting begins when the film is uniformly heated from a temperature of 25° C. and at a rate of 20° C. per minute. The term "hot stretching" as used herein is defined as stretching above the temperature at which melting begins when the film is uniformly heated from a temperature of 25° C. and at a rate of 20° C. per minute, but below the normal melting point of the polymer, i.e., below the temperature at which fusion occurs. As is known to those skilled in the art, the temperature at which melting begins and the fusion temperature may be determined by a standard differential thermal analyzer (DTA), or by other known apparatus which can detect thermal transitions of a polymer.

The temperature at which melting begins varies with the type of polymer, the molecular weight distribution of the polymer, and the crystalline morphology of the film. For example, polypropylene elastic film may be cold stretched at a temperature below about 120° C. preferably between about 10° C. and 70° C. and conveniently at ambient temperature, e.g., 25° C. The cold stretched polypropylene film may then be hot stretched at a temperature above about 120° and below the fusion temperature, and preferably between about 130° C. and about 150° C. Again, the temperature of the film itself being stretched is referred to herein as the stretch temperature. The stretching in these two steps or stages must be consecutive, in the same direction, and in that order, i.e., cold then hot, but may be done in a continuous, semi-continuous, or batch process, as long as the cold stretched film is not allowed to shrink to any significant degree, e.g., less than 5 percent of its cold stretched length, before being hot stretched.

The sum total amount of stretching in the above two steps may be in the range of about 10 to 300 percent and preferably about 50 to 150 percent, based on the initial length of the elastic film. Further, the ratio of the amount of hot stretching to the sum total of stretching or drawing may be from above about 0.10:1 to below about 0.99:1, preferably from about 0.50:1 to 0.97:1, and most preferably from about 0.60:1 to 0.95:1. This relationship between the "cold" and "hot" stretching is referred to herein as the "extension ratio" (percent "hot" extension to the percent "total" extension).

In any stretching operations where heat must be supplied, the film may be heated by heat supplied by the moving rolls which may in turn be heated by an electrical resistance method, by passage over a heated plate, through a heated liquid, a heated gas, or the like.

After the above-described two stage or two step stretching, the stretched film is heat set. This heat treatment may be carried out at a temperature in the range from about 125° C. up to less than the fusion temperature, and preferably about 130 to 160° C. for polypropylene; from about 80° C. up to less than fusion temperature, and preferably about 140 to 160° C., for acetal polymers; from about 75° C. up to less than fusion temperature, and preferably about 115 to 130° C., for polyethylene, and at similar temperature ranges for other of the above mentioned polymers. This heat treatment should be carried out while the film is being held under tension, i.e., such that the film is not free to shrink or can shrink to only a controlled extent not greater than about 15 percent of its stretched length, but not so great a tension as to stretch the film more than an additional 15 percent. Preferably, the tension is such that substantially no shrinkage or stretching occurs, e.g., less than 5 percent change in stretched length.

The period of heat treatment which is preferably carried out sequentially with and after the drawing operation, should not be longer than 0.1 second at the higher annealing temperatures and, in general, may be within the range of about 5 seconds to 1 hour and preferably about 1 to 30 minutes.

The above described setting steps may take place in air, or in other atmospheres such as nitrogen, helium or argon.

Figure 2:
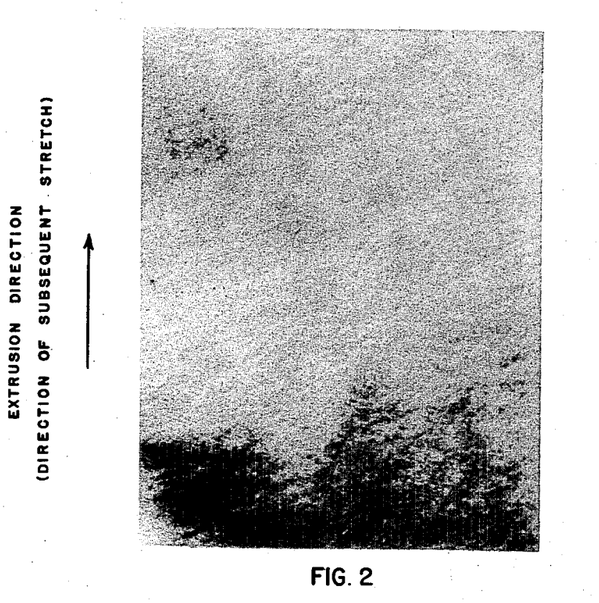
FIG. 2 is a photograph taken using electron microscopy techniques, which photograph is of an annealed polypropylene elastic starting film at a magnification of 45,000.

FIG. 2 is a photograph taken using electron microscopy techniques, i.e., a micrograph or photomicrograph, of a non-porous annealed polypropylene elastic starting film at a magnification of 45,000. This film is a portion of a starting film produced as described in comparative Examples I–IX herein. As can be seen from FIG. 2, this film shows no distinguishing structural features or characteristics, i.e., the surface of the film is relatively smooth and homogeneous.

On the other hand, distinguishing structural features are clearly shown in the microporous films shown in the micrographs of FIGS. 3 to 7.

Figure 3:
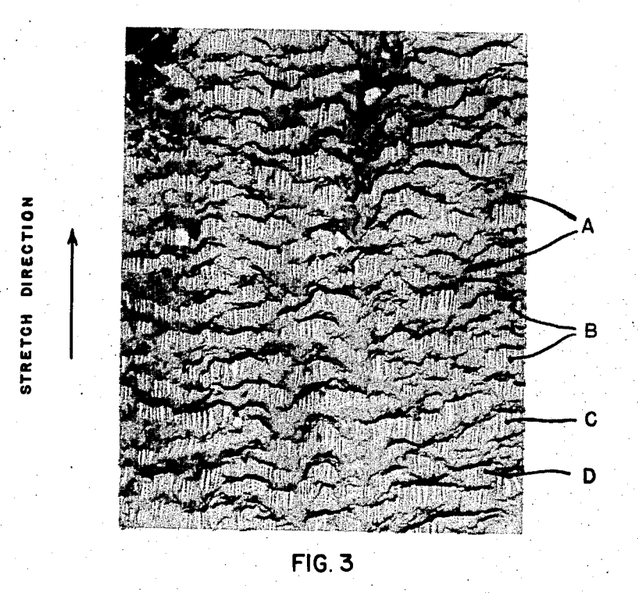
FIGS. 3, 4, and 5 are photographs taken using electron microscopy techniques, which photographs are of a polypropylene microporous film of the present invention at magnifications of 13,800, 16,800 and 54,000, respectively.
Figure 4:
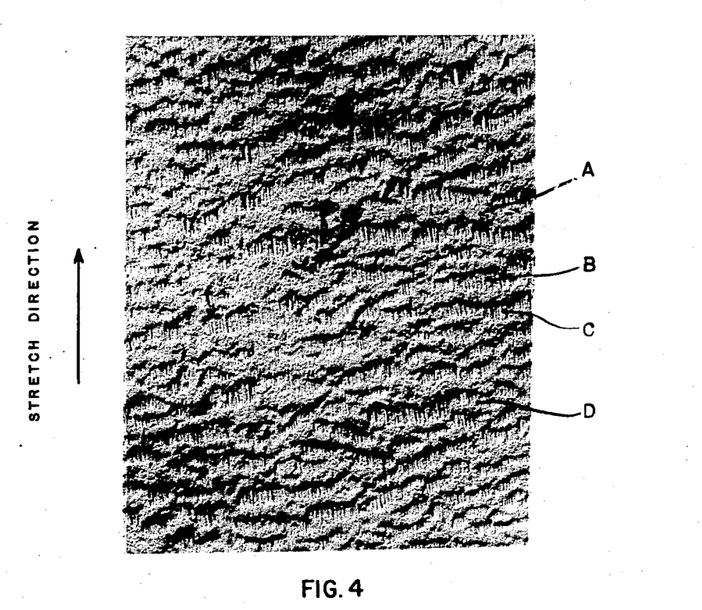
Figure 5:
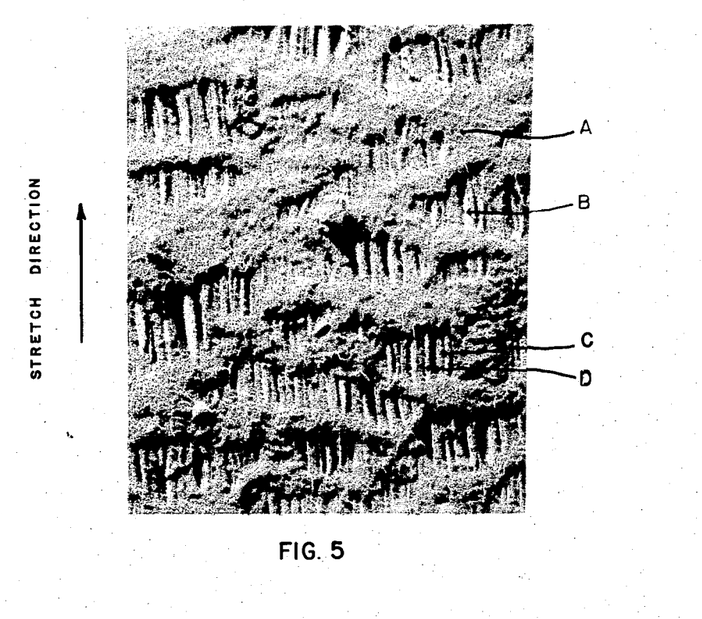
Figure 6:
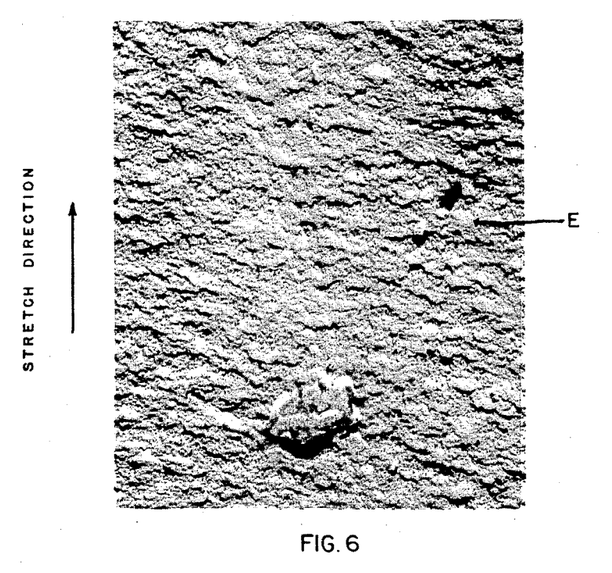
FIGS. 6 and 7 are photographs taken using electron microscopy techniques, which photographs are of a polypropylene microporous film produced by a prior art process at magnifications of 13,800 and 51,000, respectively.
Figure 7:
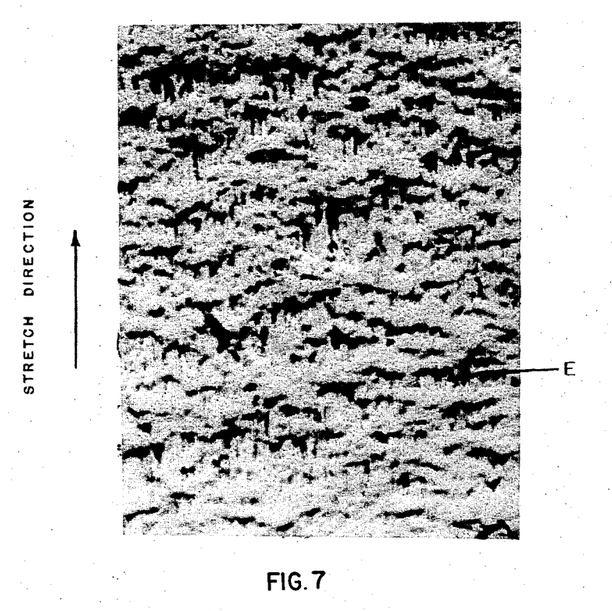

Moreover, the distinguishing structural features of a microporous film of the present invention, shown in FIGS. 3 to 5 at magnifications of 13,800, 16,800 and 54,000, respectively, are clearly different from the distinguishing structural features of a microporous film, shown in FIGS. 6 and 7 at magnifications of 13,800 and 51,000, respectively, produced by a process as described in the above-mentioned U.S. Pat. 3,426,754.

Referring to FIGS. 3 to 5, the microporous film shown therein is a portion of a microporous film of the present invention produced as described in Example VII herein. As can be seen from FIGS. 3 to 5, the microporous films of the present invention have a plurality of elongated, non-porous, interconnecting surface regions or areas A which have their axes of elongation substantially parallel to each other, and substantially normal or perpendicular to the direction in which the film is stretched or drawn according to the process of the present invention. Substantially alternating with and defined by the non-porous surface regions A is a plurality of elongated, porous surface regions B which contain a plurality of parallel fibrils C. The fibrils C are connected at each of their ends to the non-porous regions A, and are substantially perpendicular to them. Between the fibrils C are the pores D, which appear white or whitish, on the film.

Referring to FIGS. 6 and 7, the microporous film shown therein is a portion of a microporous film produced by a prior art procedure described in comparative Example 1. As can be seen from FIGS. 6 and 7, the pores or voids E, which appear white or whitish, are not as concentrated, i.e., there are fewer of them and they occur randomly. Further, the distribution of pore length is very broad, and the total pore area is less than one-half of that of the microporous film of the present invention shown in FIGS. 3 to 5.

The above discussed micrographs were taken using the electron microscopy technique described in Geil's Polymer Single Crystals, page 69 (Interscience 1963), and are considered as true reproductions.

The microporous films of the present invention, in a tensionless state, have a lowered bulk density compared with the density of corresponding polymeric elastic materials having no-open-celled structure, e.g. those from which it is formed. Thus the films have a bulk density no greater than 95 percent and preferably 50 to 75 percent of the elastic starting material. Stated another way, the bulk density has been reduced by at least 5 percent and preferably 15 to 50%. For polypropylene, the reduction is 15 to 42%, preferably 38%, and for polyethylene, 34 to 41%. The bulk density is also a measure of porosity that is, where the bulk density is about 50 to 75% of the starting material, the porosity has been increased by 50 to 25% because of the pores or holes.

The final crystallinity of the microporous film is preferably at least 30 percent, more preferably at least 40 percent, and more suitably about 50 to 100 percent, as determined by the aforementioned X-ray method.

The microporous films of the present invention may also have an average pore size of 100 to 5,000 angstroms, and more usually 150 to 3,000 angstroms, the values being determined by mercury porosimetry, as described in an article by R. G. Quynn, on pages 21–34 of Textile Research Journal, January 1963.

Generally, the microporous film of this invention has, at 25° C. and 65 percent relative humidity, an elastic recovery from a 50 percent extension of 60 to 85 percent, a tensile strength of 20,000 to 30,000 p.s.i., a modulus of 100,000 to 300,000 p.s.i. (all the foregoing in the machine direction), and a haze of 30 percent to opaque, depending on film thickness. The "elastic recovery" is an important characteristic as it distinguishes the films from prior art films of the same type in which openings have been placed therein by processes other than the invention. Films formed from polypropylene also have a breaking elongation of 50 to 150 percent.

The values of "recovery" or "elastic recovery" hereinbefore referred to are elastic values determined as follows at 25° C. and 65 percent relative humidity:

A sample 15 millimeters in width was placed in an Instron tensile property testing machine with the jaw separation being 2 inches apart. The sample was extended at a rate of 2 inches per minute until a 50 percent extension was reached. The sample was held at the extension for 1 minute and then relaxed at the same rate as extended. A reading was recorded as soon as a no-load condition was indicated by the testing machine. The elastic recovery is then calculated as follows:

Elastic recovery $$= \frac{\left(\begin{array}{c}\text{total length}\\\text{when extended}\end{array}\right) - \left(\begin{array}{c}\text{final distance}\\\text{between jaws}\end{array}\right)}{\text{length added when extended}} \times 100\%$$

The other properties mentioned were determined with a standard ASTM method as follows:

Tensile strength, ASTM # D882—Method A (Sample width 15 mm.)

Breaking elongation, ASTM # D882—Method A (Sample width 15 mm.)

Modulus, ASTM # D882—Method A (Sample width 1 inch)

Haze, ASTM # D1003—Procedure A as per FIG. 2.

Further, polypropylene microporous film of the present invention exhibits water vapor transmittance as high as 1800, generally 500 to 1400, the units of transmittance being given in cc./24 hours-m.$^2$-atm., the method of determining transmittance being ASTM E96–63T (Procedure B).

A further important distinguishing characteristic of the microporous films of the present invention with respect to those of the prior art resides in the nitrogen flux determination.

The values of nitrogen flux referred to are calculated as follows:

A film having a standard surface area of 6.5 cm.$^2$ is mounted in a standard membrane cell having a standard volume of 63 cm.$^3$, and the cell is pressurized to a standard differential pressure (the pressure drop across the film) of 200 p.s.i. with nitrogen. The supply of nitrogen is then closed off and the time required for the pressure to drop to a final differential pressure of 150 p.s.i. as the nitrogen permeates through the film is measured with a stop watch. The nitrogen flux, Q (in g. mol/cm.$^2$ min.$\times 10^3$), is then determined from the equation:

$$Q = \frac{27.74 \times 10^3}{\Delta t \times T}$$

$\Delta t$ = elapsed time (in seconds)
$T$ = temperature of nitrogen (in ° K.)

which is derived from the gas law, $PV = ZnRT$.

The novel microporous films of the present invention advantageously exhibit a nitrogen flux or Q value of at least 35.4, more preferably a value of at least 40 and highly preferably a value of from about 50 to 300. With respect to specific microporous films, the nitrogen flux for films formed from polypropylene or polyethylene ranges from about 50 to 200 and highly preferably about 100 in optimum products.

As can be seen from Table 1 following, optimum nitrogen flux and thermal stability for polypropylene are obtained when the extension ratio is greater than 0.60:1 and less than 1.0:1. Further, the advantages of the present invention can be illustrated by comparison of identical elastic film stretched 100 percent "hot" (extension ratio of 1.0:1) or 100 percent "cold" (extension ratio of 0.1) with one where as little as 5 percent cold stretch (extension ratio of 0.95:1) prior to the hot stretch gives excellent porosity and stability.

When novel microporous films of the present invention are prepared which exhibit the required nitrogen flux and porosity values, that is a nitrogen flux of at least 35.4 and preferably 50 to 300, and a bulk density about 50 to 75% of the bulk density of the corresponding polymer film having no open-celled structure, the resulting films will also be found to have a surface area within certain predictable limits. This surface area value or characteristic is inherent in the films when they also have the nitrogen flux and reduced bulk density values given above. Thus, in the films of the present invention when nitrogen flux values and bulk density values are as indicated, they will also be found to have a surface area of at least 30 sq. m./cc. and preferably in the range of about 40 to 200 sq. m./cc. For films formed from polypropylene, the surface area generally ranges from about 30 to 110 sq. m./cc. and preferably about 60 sq. m./cc. For microporous polyethylene films prepared according to the present invention, the surface area range is about 30 to 35 sq. m./cc.

Surface area may be determined from nitrogen or krypton gas adsorption isotherms using a method and apparatus described in U.S. Patent 3,262,319. The surface area obtained by this method is usually expressed as square meters per gram.

In order to facilitate comparison of various materials, this value can be multiplied by the bulk density of the material in grams per cc. resulting in a surface area quantity expressed as square meters per cc.

The following examples are presented to illustrate certain preferred embodiments of the invention but it is not to be considered as limited thereto.

EXAMPLES I–IX

Crystalline polypropylene having a melt index of 0.7 and a density of 0.92 was melt extruded at 230° C. through an 8 inch slit die of the coat hanger type using a 1 inch extruder with a shallow metering screw. The length to diameter ratio of the extruder barrel was 24/1. The extrudate was drawn dow very rapidly to a melt drawdown ratio of 150, and contacted with a rotating casting roll maintained at 50° C. and 0.75 inch from the lip of the die. The film produced in this fashion was found to have the following properties: thickness, 0.001 inch; recovery from 50 percent elongation at 25° C., 50.3 percent; crystallinity, 59.6 percent.

A sample of this film was oven annealed with air with a slight tension at 140° C. for about 30 minutes, removed from the oven and allowed to cool. It was then found to have the following properties: recovery from a 50 percent elongation at 25° C., 90.5 percent; crystallinity, 68.8 percent. An electron micrograph of a portion of this intermediate or elastic starting film is shown in FIG. 1.

Samples of the annealed elastic film were then subjected to various extension ratios as shown in Table I, and thereafter heat set under tension, i.e., at constant length, at 145° C. for 10 minutes in air. The cold drawing portion was conducted at 25° C., the hot drawing portion was conducted at 145° C., total draw was 100 percent, based on the original length of the elastic film. Thermal stability was determined by measuring nitrogen flux after various intervals of residence at 65° C. The results are summarized in Table I.

EXAMPLE XIX

To characterize the uniqueness of the microporous film obtained by the present invention, four inch by three and three-quarters inch samples of cold stretched microporous films of 1 mil caliper thickness, were produced by cold (at 25° C.) stretching a portion of the elastic film described in Example I to 100 percent of its original length and then heat setting the cold stretched film under tension, i.e., at its stretched length, for 10 minutes at about 140° C.

Similarly sized samples were obtained by hot (135° C.) stretching a portion of the elastic film to 100 percent of its original length and heat setting under tension for 10 minutes at about 140° C.

Other similarly sized samples of cold stretched-hot stretched film (at an extension ratio of 0.90:1) described in Example VII were used for comparison purposes.

These samples were soaked, i.e., completely immersed, in perchloroethylene, a common dry cleaning solvent, at 25° C. for 10 minutes. The effects of the solvent on nitrogen flux at 25° C. is summarized in Table II.

TABLE II.—EFFECT OF SOLVENT ON NITROGEN FLUX[a] ON MICROPOROUS POLYPROPYLENE FILMS

| Solvent | 100% cold stretch process | | | 100% hot stretch process | | | Cold stretch/hot stretch process | | |
|---|---|---|---|---|---|---|---|---|---|
| | Flux before treatment, ×10² ($F_1$) | Flux after treatment, ×10² ($F_2$) | P.R. value [b] | Flux before treatment, ×10³ | Flux after treatment, ×10³ | P.R. value [b] | Flux before treatment, ×10² ($F_1$) | Flux after treatment, ×10² ($F_2$) | P.R. value [b] |
| Perchloroethylene | 46.65 | 45.54 | −2.38% | 39.85 | 12.40 | −68.9% | 174 | 319 | +45.5% |

[a] G.mols/cm.²/min.

[b] P.R. value (perchloroethylene reaction value) = $\frac{F_2-F_1}{F_1} \times 100\%$.

As can be seen from Table II, treatment of a microporous polypropylene film prepared by the cold stretch/hot stretch process with perchlorethylene caused a dramatic increase, e.g., over 45 percent, in the porosity of the film as measured by the increase in nitrogen flux (hereinafter referred to as the P.R. value). There was a loss in nitrogen flux, however, when the cold stretch process film and the hot stretched process film were treated with the same solvent, as evidenced by negative P.R. values of −2.38 percent and −68.9 percent, respectively.

In general, the microporous films of the present invention have zero or positive, i.e., greater than zero, P.R. values, and these P.R. values may, for example, range from 0 to 100 percent, and more usually from 20 to 50 percent.

EXAMPLE XX

The film-forming polymer of this example is a copolymer of trioxane and 2 weight percent, based on the weight of the polymer, of ethylene oxide of the type described in U.S. Pat. 3,027,352, which is after-treated to remove un- TABLE I.—NITROGEN FLUX (G. MOLE/CM.² MIN.×10³) OF MICROPOROUS POLYPROPYLENE FILM AFTER 65° C. STORAGE

| Example | Extension ratio | Initial flux | Flux after— | | | | | | |
|---|---|---|---|---|---|---|---|---|---|
| | | | 1.0 hr. | 3.0 hrs. | 48 hrs. | 87 hrs. | 159 hrs. | 231 hrs. | 252 hrs. |
| I[a] | 0.0 | 35.4 | 0 | | | | | | |
| II | 0.10 | 45.5 | 0 | | | | | | |
| III | 0.20 | 46.7 | 0 | | | | | | |
| IV | 0.40 | 61.7 | 1.33 | 0 | | | | | |
| V | 0.60 | 76.1 | 34.8 | 21.5 | 1.54 | 0 | | | |
| VI | 0.80 | 100 | 79.9 | 71.0 | 42.5 | 36.8 | 33.0 | 27.7 | 24.5 |
| VII | 0.90 | 127.5 | 106 | 100 | 71.0 | 66.0 | 61.7 | 56.3 | Split |
| VIII | 0.95 | 113 | 100 | 87 | 71.0 | 61.7 | 59.8 | 54.7 | 56.3 |
| IX[b] | 1.0 | 19.7 | 13.7 | 11.9 | 7.8 | 5.5 | Split | | |

[a] 100% cold stretch. [b] 100% hot stretch.

EXAMPLES X TO XVIII

Examples I–IX were repeated except the heat-set conditions of temperature and time were varied, using 130° C. for 5 minutes, and 150° C. for 10 minutes. Their effect on the rate of nitrogen flux is shown graphically in FIG. 8, along with the results of Examples I–IX.

Figure 8:
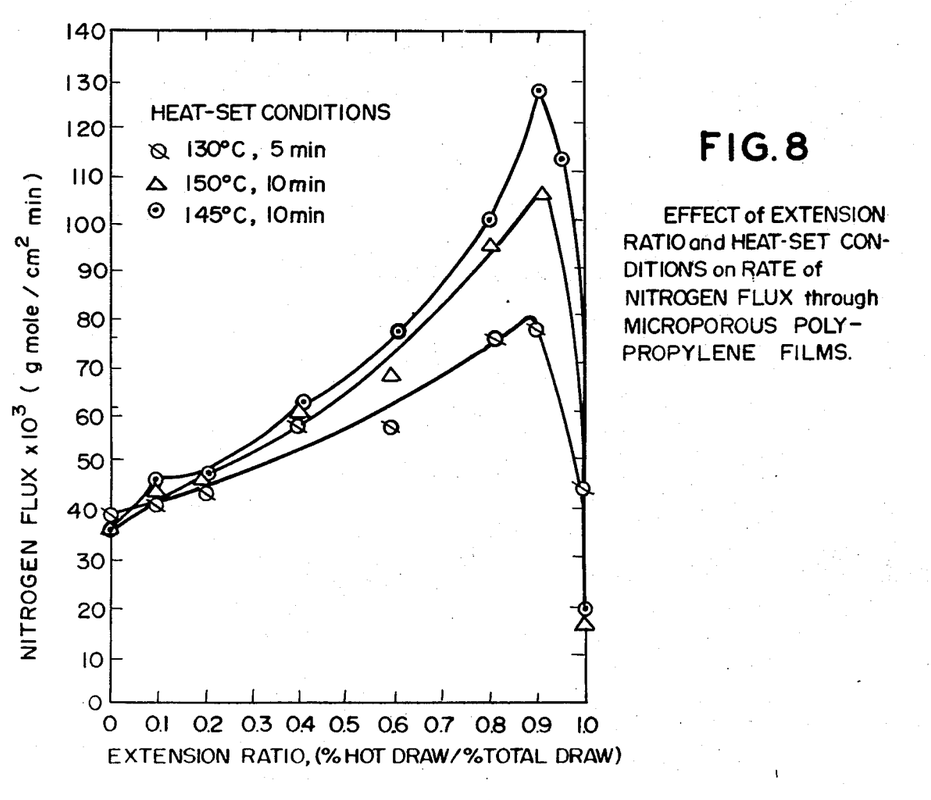
FIG. 8 is a graph illustrating the effect at certain heat set conditions of various cold stretching and hot stretching operations on the rate of nitrogen flux through microporous polypropylene films.

As can be seen from FIG. 8, higher flux values were obtained using consecutive cold and hot stretching steps at each of the heat-set conditions than either type of stretching used alone.

stable groups as described in U.S. Pat. 3,219,623, and which has a melt index of 2.5.

The above-described polymer is melt extruded at 195° C. through an 8 inch slit of the coat hanger type using a 1 inch extruder with a shallow channel metering screw. The length to diameter ratio of the extruder barrel was 24:1. The extrudate is drawn down to a drawdown ratio of 150:1, contacted with a rotating casting roll maintained at about 145° C., and about one-quarter inch from the lip of the die. The film produced in this manner is wound up and found to have the following properties: thickness, .0005 inch; recovery from 50 percent strain, 45 percent. The polymer is then oven annealed in the tensionless state at 145° C. for 16 hours. At the end of the annealing period it is removed from the oven, allowed to cool and found to have the following properties: thickness, .0005 inch; recovery from 50 percent elongation, 92 percent.

The film is cold stretched at 25° C. to 10 percent of its original length, and thereafter stretched at 130° C. to a total extension of 100 percent of its original length, and thereafter heat set at constant length in an oven at 140° C. for 2 minutes. At the end of this period it is removed from the oven, allowed to cool and found to have the open-celled microporous structure of the present invention.

EXAMPLE XXI

Crystalline polyethylene having a density of 0.96 and a melt index of 0.7 is melt extruded at 195° C. through a 4 inch diameter annular die having an opening of 0.04 inch. The hot tube thus formed is expanded 1.5 times by internal air pressure and cooled by an air stream impinging on the film from an air ring located around and above the die. The extrusion is accomplished with an extruder of 24:1 length to diameter ratio and a shallow channel metering screw. The extrudate is drawn down to a drawdown ratio of 100:1 and passed through a series of rollers which collapses the tube. After wind-up the film is oven annealed in a tensionless state at 115° C. for 16 hours.

After removal from the oven, the film is allowed to cool, and stretched at an extension ratio of 0.80, by 50 percent of its original length with cold stretching being conducted at 25° C. and hot stretching being conducted at 115° C., and heat set in the oven at constant length for 5 minutes at 120° C., after which it is found to have the open-celled microporous structure of the present invention.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the present invention.

What is claimed is:

1. An open-celled microporous polymer film characterized by having a reduced bulk density as compared to the bulk density of the corresponding polymer film having no open-celled structure, a crystallinity of above about 30%, a pore size of less than 5,000 angstroms, and a nitrogen flux, measured after one hour storage at 65° C., of more than 30.

2. A polymer film in accordance with claim 1 wherein the nitrogen flux prior to storage at 65° C. is in excess of 35.4.

3. A polymer film in accordance with claim 2 wherein the film has a nitrogen flux, before storage at 65° C., of at least 40.

4. A polymer film in accordance with claim 1 which has a bulk density of about 50–75% of the bulk density of the corresponding polymer film having no open-celled structure.

5. A polymer film in accordance with claim 1 wherein the film has a surface area of at least 30 square meters per cubic centimeter.

6. A polymer film in accordance with claim 1 wherein the polymer is selected from the group consisting of polyolefins, polyacetals, polyamides, polyesters, polyalkylene sulfides and polyarylene oxide.

7. A polymer film in accordance with claim 1 further characterized by a plurality of interconnecting non-porous surface regions, the non-porous surface regions being elongated and having their axes of elongation substantially parallel; and a plurality of porous surface regions which include a plurality of fibrils, with the porous surface regions being defined by the non-porous surface regions, the porous surface regions and the non-porous surface regions substantially alternating, and the fibrils being connected at each of their ends to the non-porous surface regions, the fibrils being substantially parallel and being substantially perpendicular to said axes of elongation, and, the fibrils defining pore spaces in the porous surface regions of the film, the pore spaces being less than 5,000 angstroms and interconnecting from first surfaces to second surfaces of the film.

8. A polymer film in accordance with claim 1 wherein the polymer is polypropylene.

9. A polypropylene film in accordance with claim 8 wherein the bulk density is about 58 to 85% of the bulk density of the corresponding polypropylene film having no open-celled structure.

10. A polypropylene film in accordance with claim 8 wherein the film has a nitrogen flux, before storage at 65° C., of at least 40.

11. A polypropylene film in accordance with claim 8 wherein the film has a surface area of about 30–110 square meters per cubic centimeter.

12. A polypropylene film in accordance with claim 8 which has a bulk density of about 62% of the bulk density of the corresponding polypropylene film having no open-celled structure, a nitrogen flux, before 1 hour storage at 65° C., of about 100 and a surface area of about 60 square meters per cubic centimeter.

13. A polypropylene polymer film in accordance with claim 8 which has a perchloroethylene reaction value of 0 or greater.

14. A polymer film in accordance with claim 1 wherein the polymer is polyethylene.

15. A polyethylene film in accordance with claim 14 wherein the film has a bulk density of about 59–66% of the bulk density of the corresponding polyethylene film having no open-celled structure.

16. A polyethylene film in accordance with claim 14 which has a surface area of 30–35 square meters per cubic centimeter.

17. A polyethylene film in accordance with claim 14 wherein the film has a nitrogen flux, before 1 hour storage at 65° C., of 50 to 200.

References Cited

UNITED STATES PATENTS 3,426,754   2/1969   Bierenbaum et al. __ 117—122 P
3,485,705   12/1969  Harmon ____________ 161—402

WILLIAM J. VAN BALEN, Primary Examiner

U.S. Cl. X.R.

156—196, 229; 161—247, 402